United States Patent
Ong et al.

(10) Patent No.: US 6,515,577 B1
(45) Date of Patent: Feb. 4, 2003

(54) CHANNEL MONITORING BY A MULTICHANNEL SELECTIVE CALL RECEIVER

(75) Inventors: Dee Nai Ong, Singapore (SG); Yong Tong Chua, Singapore (SG); Kim Hoong Ngai, Singapore (SG); Karl Robert Weiss, Singapore (SG)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/341,029

(22) PCT Filed: Jan. 10, 1997

(86) PCT No.: PCT/SG97/00073

§ 371 (c)(1),
(2), (4) Date: Jun. 30, 1999

(87) PCT Pub. No.: WO98/31166

PCT Pub. Date: Jul. 16, 1998

(30) Foreign Application Priority Data

Jan. 10, 1997 (SG) .............................................. 9700047

(51) Int. Cl.⁷ ................................................. H04Q 7/00
(52) U.S. Cl. ...................... 340/7.43; 340/7.2; 340/7.39; 340/7.27; 340/7.42; 370/311; 370/312; 370/313; 370/458; 370/336; 370/337; 370/347; 455/426
(58) Field of Search ................................. 340/7.2, 7.39, 340/7.4, 7.42, 7.43, 7.27; 455/426, 432, 458; 370/311, 312, 313, 458, 277, 329, 336, 349, 350, 509, 512, 337, 347; 375/225

(56) References Cited

U.S. PATENT DOCUMENTS

| | | | |
|---|---|---|---|
| 4,914,649 A | * | 4/1990 | Schwendeman et al. ..... 370/311 |
| 5,555,183 A | | 9/1996 | Willard et al. |
| 5,610,919 A | * | 3/1997 | Willard et al. .............. 370/336 |
| 5,634,914 A | | 6/1997 | Petreye et al. |
| 5,682,147 A | * | 10/1997 | Eaton et al. ................ 340/7.27 |
| 5,724,389 A | * | 3/1998 | Marko et al. ................ 375/225 |

OTHER PUBLICATIONS

PCT Int'l Publication No.: WO 89/06475, Int'l Publication Date Jul. 13, 1989, Int'l Patent.

* cited by examiner

Primary Examiner—Brian Zimmerman
Assistant Examiner—Yves Dalencourt
(74) Attorney, Agent, or Firm—Daniel C. Crilly

(57) ABSTRACT

A multichannel selective call receiver (10) includes-a receiver (11), a controller (16), a baud detector (17) and a memory (18). The controller is adapted to control the receiver in receiving information on a channel (14). The information on the channel includes mandatory frames having information fields. If the information fields in a mandatory frame on the channel do not indicate more information for the multichannel selective call receiver in the rest of the mandatory frame, the controller controls the receiver to receive information on other channels (15) during the rest of the mandatory frame. The information on the channel and the other channels is processed in accordance with channel priority as indicated in a channel list stored in the memory.

13 Claims, 3 Drawing Sheets

CHANNEL MONITORING BY A MULTICHANNEL SELECTIVE CALL RECEIVER

FIELD OF THE INVENTION

This invention relates to selective call receivers, such as pagers, operating in a communication environment. In particular, this invention relates to, but is not necessarily limited by, channel monitoring by a multichannel selective call receiver operating in a communication environment.

BACKGROUND OF THE INVENTION

Selective call receivers, such as pagers, of a selective call system receive information transmitted on carrier frequencies or channels within a communication environment. Such information is typically formatted according to messaging protocols defined for the selective call system. For example, Motorola's FLEX™ selective call system has a messaging protocol in which information is grouped into frames which are then A transmitted as a cycle. A FLEX™ cycle has one hundred and twenty eight frames of which some are mandatory frames transmitted at the start of the FLEX™ cycle. Each of the mandatory frames is divided into information fields. Information fields at the start of a mandatory frame can point to more information for a selective call receiver in the rest of the mandatory frame. For example, the address field can address one or more selective call receivers which will have more information provided by the rest of the mandatory frame.

Receiving information from a FLEX™ cycle requires a selective call receiver to synchronize to the FLEX™ cycle to monitor for the information. Synchronizing has to be attained at or before the mandatory frames to receive information from the information fields of such frames. Upon processing the mandatory frames, other information, such as assigned frames that provide information specifically for the selective call receiver, can be determined to receive more information from the FLEX™ cycle. In a FLEX™ communication environment that supports multichannel selective call receivers, FLEX™ cycles are synchronously transmitted on different channels by referencing such cycles to external time signals provided by, for example, a Global Positioning System. These multichannel selective call receivers are supported by what is referred to as a FLEX™ roaming system. Channels for multichannel selective call receivers in the FLEX™ roaming system are also known as roaming channels.

Determining which channel to monitor is critical for multichannel selective call receivers in a FLEX™ roaming system as information can be received from different FLEX™ cycles transmitted concurrently on different roaming channels. Each of these different roaming channels should be monitored quickly as there can be a problem of not detecting information transmitted on another. Furthermore, invalid channels which are not roaming channels of the FLEX™ roaming system can provide FLEX™ cycles that may be inadvertently detected. Such invalid channels should be quickly distinguished from valid channels that can provide information to the multichannel selective call receivers.

SUMMARY OF THE INVENTION

It is an object of this invention to overcome or at least alleviate at least one of the problems associated with channel monitoring by a multichannel selective call receiver operating in a communication environment.

According to one aspect of the invention, there is provided a multichannel selective call receiver comprising:

a receiver for receiving information on a channel, said information being formatted as a cycle having a plurality of frames including at least one mandatory frame having an address field; and processing means coupled to said receiver, wherein said processing means is adapted to control said receiver to receive information on other channels within said mandatory frame when said address field does not address said multichannel selective call receiver in said mandatory frame.

Preferably, said processing means can be further adapted to control said receiver to receive information on said other channels following said address field and within said mandatory frame.

Suitably, said processing means can comprise a controller coupled to a baud detector, said controller being adapted to control said baud detector to perform baud detection of information.

Preferably, said processing means can further comprise a timer for determining lapse of a predetermined time period, said timer being associated with said baud detector.

Suitably, said processing means can comprise a memory for storing a channel list indicative of channel priority of said channel and said other channels.

According to another aspect of the invention, there is provided a method for channel monitoring by a multichannel selective call receiver, said method comprising the steps of:

receiving information on a channel, said information being formatted as a cycle having a plurality of frames including at least one mandatory frame having an address field; and controlling said receiver to receive information on other channels during said mandatory frame when said address field does not address said multichannel selective call receiver in said mandatory frame.

Preferably, said step of controlling can comprise the step of determining whether remaining duration of said mandatory frame is sufficient for a baud detection.

Suitably, said step of controlling can further comprise the step of selecting a next channel for said baud detection when remaining duration of said mandatory frame is sufficient, said next channel being of a higher or equal priority as indicated within a channel list stored in a memory.

Preferably, said step of controlling can further comprise the step of marking said next channel for a synchronization field sample when said baud detection determines that said next channel may be a valid channel.

Suitably, said step of controlling can further comprise the step of sampling a synchronization field of a next available mandatory frame of said next channel.

BRIEF DESCRIPTION OF THE DRAWINGS

In order to describe the invention and to put it into practical effect, reference will now be made to a preferred embodiment as illustrated with reference to the accompanying drawings in which.

DETAILED DESCRIPTION OF THE INVENTION

Figure 1:
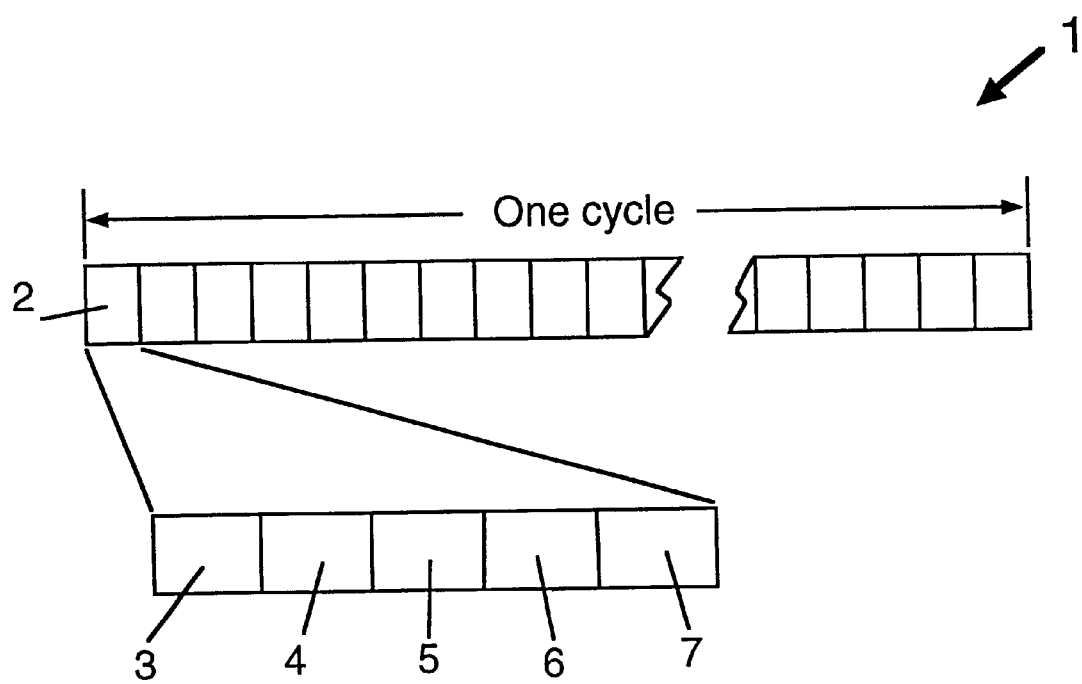
FIG. 1 shows structure of a mandatory frame in a FLEX™ cycle in accordance with a preferred embodiment of the invention.

FIG. 1 shows structure of a mandatory frame 2 in a FLEX™ cycle 1 in accordance with a preferred embodiment of the invention. FLEX™ cycle 1 has at least one mandatory frame. Mandatory frame 2 has a synchronization field 3, a block information field 4, an address field 5, a vector field 6 and a message field 7. Synchronization field 3 has a bit in a frame information word for indicating that FLEX™ cycle 1 is transmitted on a channel which supports multichannel selective call receivers as defined by the messaging protocol of FLEX™. In FLEX™, channels which support multichannel selective call receivers are also referred to as roaming channels. In this specification, a valid channel is a roaming channel that can provide information with FLEX™ cycle 1 to multichannel selective call receivers.

Figure 2:
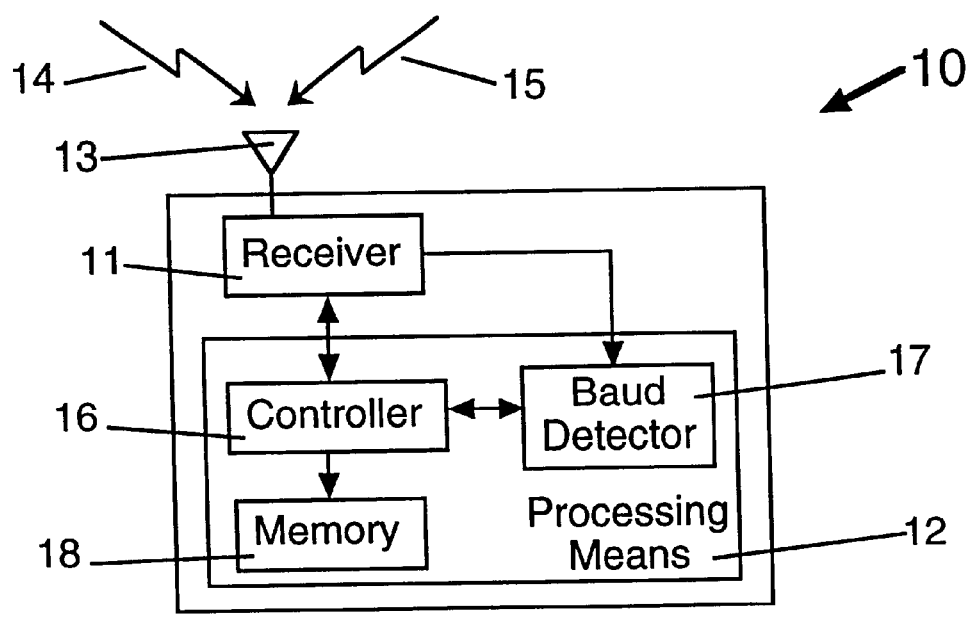
FIG. 2 shows a block diagram of a multichannel selective call receiver for receiving the FLEX™ cycle of FIG. 1.

FIG. 2 shows a block diagram of a multichannel selective call receiver 10 for receiving FLEX™ cycle 1 of FIG. 1 in a FLEX™ roaming system. Multichannel selective call receiver 10 comprises a receiver 11 and processing means 12. Receiver 11 couples to an antenna 13 for receiving information on different channels within a FLEX™ communication environment of the FLEX™ roaming system. FIG. 2 shows two channels 14, 15 as examples of the different channels. Processing means 12 comprises a controller 16, a baud detector 17 and a memory 18. Memory 18 stores a channel list indicative of channel priority of the different channels. Controller 16 couples to control receiver 11 and baud detector 17 to monitor the different channels.

When multichannel selective call receiver 10 is receiving at the start of a mandatory frame of a FLEX™ cycle on a channel, processing means 12 is adapted to control receiver 11 to receive information on other channels during the mandatory frame when an address field of the mandatory frame does not address multichannel selective call receiver 10 in the mandatory frame. This is possible because the different channels are roaming channels which support multichannel selective call receiver 10 in the FLEX™ roaming system and FLEX™ cycles on such roaming channels are synchronously transmitted. Therefore, multichannel selective call receiver 10 needs only to synchronize to any FLEX™ cycle on any roaming channel in the FLEX™ roaming system to be in synchronization with FLEX™ cycles on other roaming channels.

In processing information from mandatory frames of FLEX™ cycles of roaming channels in the FLEX™ roaming system, the invention advantageously uses information that has to be transmitted for each of the FLEX™ cycles in accordance with the messaging protocol of FLEX™. This provides a more reliable baud detection to be performed as such information will be present in the mandatory frames for processing by processing means 12 of the invention. Furthermore, multichannel selective call receiver 10 in the invention monitors other channels only when a channel that is currently monitored has no information within its mandatory frames to provide to multichannel selective call receiver 10. The invention, therefore, does not affect multichannel selective call receiver 10 in receiving information on such a channel.

Figure 3A:
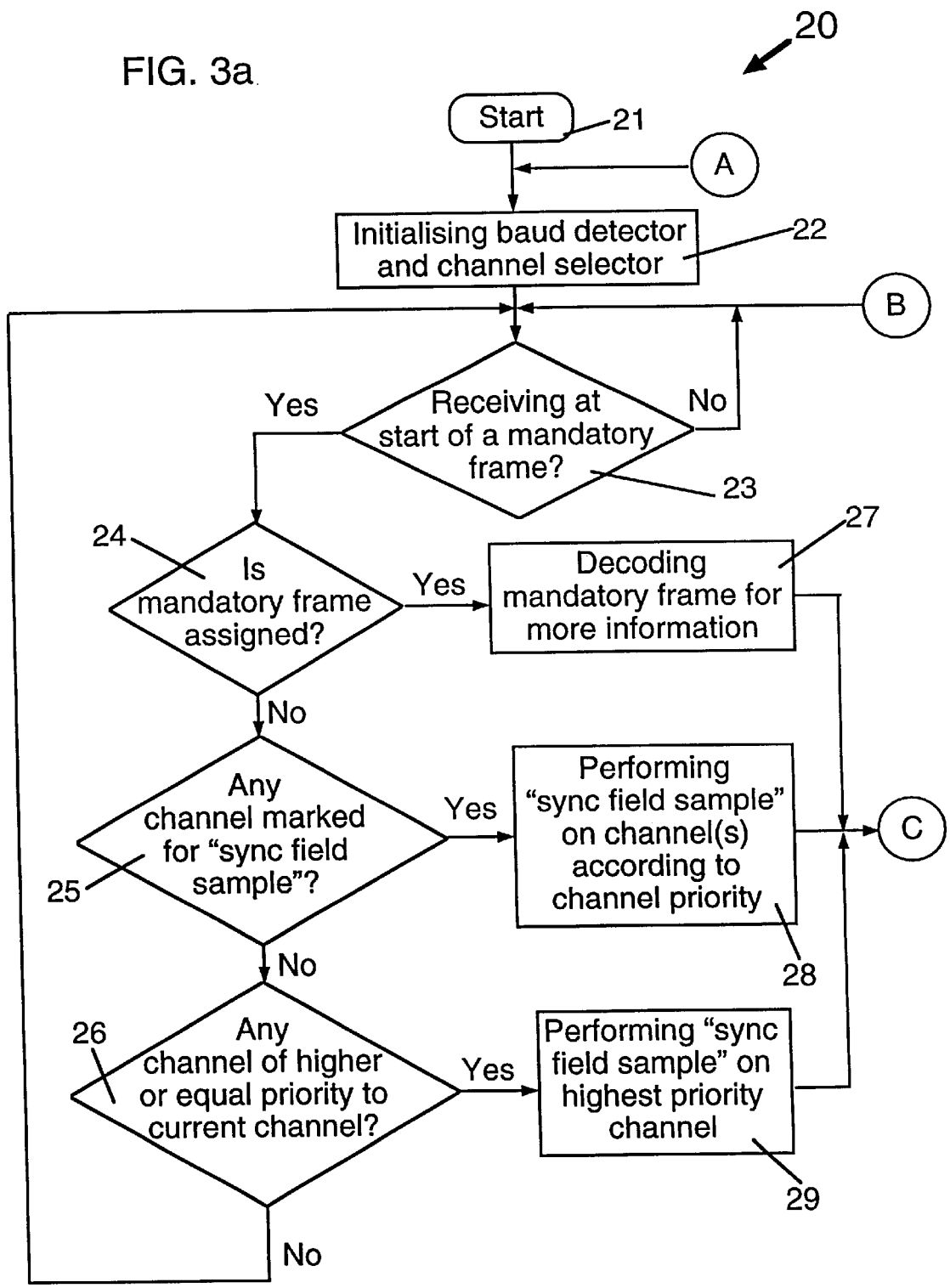
FIGS. 3a and 3b are flow diagrams showing a method for operating the multichannel selective call receiver of FIG. 2.
Figure 3B:
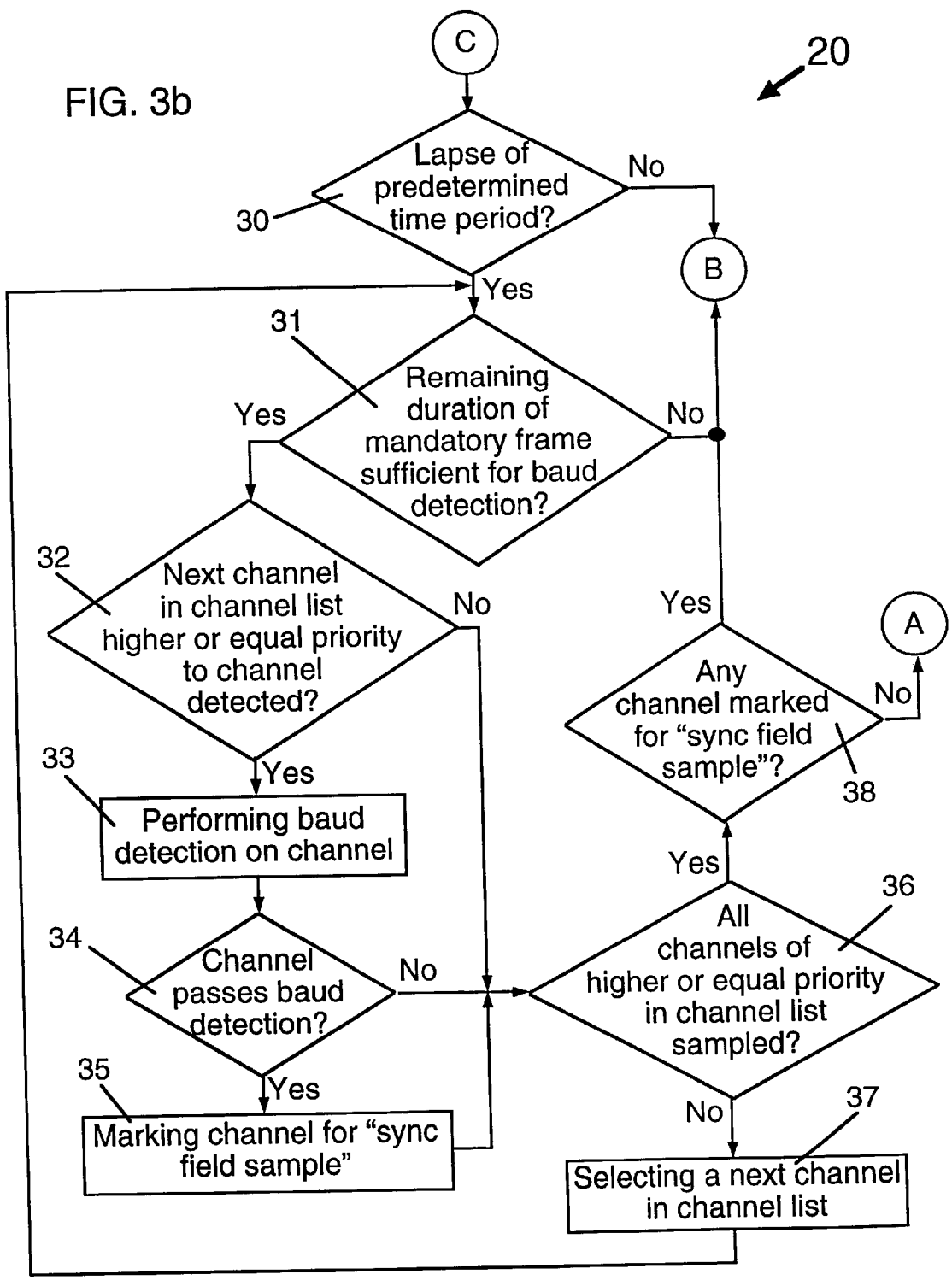

FIGS. 3a and 3b are flow diagrams showing a method 20 for operating multichannel selective call receiver 10. Starting at step 21, method 20 proceeds to initialising baud detector 17 and a channel selector for selecting a channel from a channel list on which receiver 11 is to receive information. The channel list is stored in memory 18 and is indicative of channel priority of the channel and other channels in the channel list.

At decision step 23, controller 16 determines whether receiver 11 is receiving information at the start of a mandatory frame of the channel selected at step 22. If decision step 23 is a "Yes", controller 16 checks at decision step 24 whether the mandatory frame is assigned for the channel. If decision step 24 is a "Yes" to indicate that the channel is a valid channel, method 20 then proceeds to step 27 in which controller 16 decodes the mandatory frame for more information. If decision step 24 is a "No", method then proceeds to decision step 25 in which controller 16 determines whether any channel is marked for "sync field sample" (synchronization field sample).

A channel is marked for "sync field sample" when a baud detection performed on information from the channel indicates that such a channel may be a valid channel. To confirm the channel as a valid channel, synchronization field 3 of a mandatory frame on the channel will have to be sampled to detect the bit in the frame information word indicating that the channel is a roaming channel.

When method 20 begins from step 21, only one channel has been selected by the channel selector and is being monitored so that decision step 25 typically has a "No" outcome. However, for a "Yes" outcome from decision step 25, method 20 will proceed to sampling the channel marked for "sync field sample". Sampling a channel is according to channel priority as indicated in the channel list stored in memory 18. Channel priority helps in determining an order in which channels are sampled when more than one channel is marked for "sync field sample". Upon sampling a channel, a flag for marking the channel for "sync field sample" is reset to indicate that this channel has been sampled. For a "No" to decision step 25, method 20 proceeds to decision step 26 in which controller 16 determines whether there is any channel of higher or equal priority to the channel currently selected. If decision step 26 is a "Yes", method 20 proceeds to performing a "sync field sample" on the highest priority channel at step 29. If decision step 26 is a "No", method 20 returns to decision step 23. Following a "No" from decision step 26, the channel that has been selected by the channel selector will continue to be processed by processing means 12 for another mandatory frame from decision step 23 as described above.

From steps 27, 28, 29 method 20 proceeds to decision step 30. Baud detector 17 is associated with a timer that is set to expire after lapse of a predetermined time period. This predetermined time period is variable depending upon, for example, how many different channels that multichannel selective call receiver 10 has to monitor and, consequently, how many FLEX™ cycles are necessary so that baud detection can be performed on information on the different channels. Such a timer can be provided by, for example, timing circuitry within controller 16. Initialising of baud detector 17 at step 22 also includes initialising the timer.

Method 20 returns to decision step 23 with a "No" from decision step 30. However, with a "Yes" from decision step 30, method 20 proceeds to decision step 31 in which controller 16 determines whether remaining duration of a period of the mandatory frame is sufficient for baud detection of information in the mandatory frame on one or more other channels. With a "No" from decision step 31 indicating that the remaining duration of the period of the mandatory frame is insufficient, method 20 returns to decision step 23. With a "Yes" from decision step 31 indicating that baud detection of information in the mandatory frame on the one or more other channels is possible, method 20 proceeds to decision step 32 in which priority of a next channel in the channel list is determined. If the next channel has a higher or equal priority to the channel currently being monitored, controller 16 then controls baud detector 17 in performing a baud detection on the next channel in step 33. Decision step 34 then determines whether this next channel passes the baud detection. A "Yes" from decision step 34 indicates that this next channel may potentially have information for multichannel selective call receiver 10. Such a channel is, therefore, marked for a "sync field sample" to be performed at one of its mandatory frame. Marking a channel is by, for example, setting a flag to indicate that a "sync field sample" is required for the channel.

Following step 35 or a "No" outcome from decision steps 32 or 34, method 20 checks at decision step 36 whether channels of higher or equal priority in the channel list has been sampled with a baud detection. With a "No" from decision step 36, controller 16 then selects a next channel from the channel list at step 37 and returns method 20 to decision step 31. With a "Yes" from decision step 36, controller 16 then determines in decision step 38 whether any channel has been sampled and marked for a "sync field sample". A "Yes" from decision step 38 brings method 20 back to decision step 23. Otherwise, a "No" from decision step 38 brings method 20 back to step 22.

The invention advantageously provides for multichannel selective call receiver 10 to sample different channels for information using other information provided by mandatory frames which is always present on such channels. Also, by performing a baud detection prior to a synchronization field sample, only channels that may be valid channels will be processed subsequently. This saves time as invalid channels will not be inadvertently detected and unnecessarily monitored. Furthermore, the invention advantageously allows prioritization of different channels so that a synchronization field at the start of a mandatory frame is more efficiently used and, therefore, channel monitoring is more effective.

Although the invention has been described with reference to a preferred embodiment, it is to be understood that the invention is not restricted to the embodiment described herein.

We claim:

1. A multichannel selective call receiver comprising:
   a receiver for receiving information on a channel, said information being formatted as a cycle having a plurality of frames including at least one mandatory frame having an address field; and
   processing means coupled to said receiver, said processing means being adapted to control said receiver to receive information on other channels following said address field and within said mandatory frame when said address field does not address said multichannel selective call receiver in said mandatory frame.

2. The multichannel selective call receiver as claimed in claim 1, wherein said processing means comprises a controller coupled to a baud detector, said controller being adapted to control said baud detector to perform baud detection of information.

3. The multichannel selective call receiver as claimed in claim 2, wherein said processing means further comprises a timer for determining lapse of a predetermined time period, said timer being associated with said baud detector.

4. The multichannel selective call receiver as claimed in claim 1, wherein said processing means comprises a memory for storing a channel list indicative of channel priority of said channel and said other channels.

5. A method for channel monitoring by a multichannel selective call receiver, said method comprising the steps of:
   receiving information on a channel, said information being formatted as a cycle having a plurality of frames including at least one mandatory frame having an address field;
   determining whether a remaining duration of said mandatory frame is sufficient for a baud detection; and
   controlling said receiver to receive information on other channels during said mandatory frame when said address field does not address said multichannel selective call receiver in said mandatory frame and said remaining duration of said mandatory frame is sufficient for a baud detection.

6. The method as claimed in claim 5 wherein said step of controlling further comprises the step of selecting a next channel for said baud detection when remaining duration of said mandatory frame is sufficient, said next channel being of a higher or equal priority as indicated within a channel list stored in a memory.

7. The method as claimed in claim 6 wherein said step of controlling further comprises the step of marking said next channel for a synchronization field sample when said baud detection determines said next channel may be a valid channel.

8. The method as claimed in claim 7 wherein said step of controlling further comprises the step of sampling a synchronization field of a next available mandatory frame of said next channel.

9. A method for channel monitoring by a multichannel selective call receiver, said method comprising the steps of:
   receiving information on a channel, said information being formatted as a cycle having a plurality of frames including at least one mandatory frame having an address field; and
   controlling said receiver to receive information on other channels following said address field and within said mandatory frame when said address field does not address said multichannel selective call receiver in said mandatory frame.

10. The method as claimed in claim 9, wherein said step of controlling further comprises the step of determining whether a remaining duration of said mandatory frame is sufficient for a baud detection.

11. The method as claimed in claim 10 wherein said step of controlling further comprises the step of selecting a next channel for said baud detection when remaining duration of said mandatory frame is sufficient, said next channel being of a higher or equal priority as indicated within a channel list stored in a memory.

12. The method as claimed in claim 11 wherein said step of controlling further comprises the step of marking said next channel for a synchronization field sample when said baud detection determines said next channel may be a valid channel.

13. The method as claimed in claim 12 wherein said step of controlling further comprises the stop of sampling a synchronization field of a next available mandatory frame of said next channel.

* * * * *